United States Patent

Obara

[11] Patent Number: 6,071,135
[45] Date of Patent: Jun. 6, 2000

[54] ELECTRICAL CARD CONNECTOR

[75] Inventor: Shu Obara, Tokyo, Japan

[73] Assignee: Hirose Electric Co., Ltd., Tokyo, Japan

[21] Appl. No.: 09/236,327

[22] Filed: Jan. 25, 1999

[30] Foreign Application Priority Data

Jan. 28, 1998 [JP] Japan ................................ 10-029050

[51] Int. Cl.[7] .............................................. H01R 13/62
[52] U.S. Cl. ............................................................. 439/159
[58] Field of Search ................................... 439/159, 160, 439/152, 153, 157; 361/259, 754

[56] References Cited

U.S. PATENT DOCUMENTS

| | | | |
|---|---|---|---|
| 5,507,658 | 4/1996 | Ho | 439/159 |
| 5,558,527 | 9/1996 | Lin | 439/155 |
| 5,597,316 | 1/1997 | David et al. | 439/159 |
| 5,599,197 | 2/1997 | Ishida et al. | 439/159 |
| 5,713,750 | 2/1998 | Ho | 439/159 |
| 5,846,096 | 12/1998 | Ishida | 439/159 |

FOREIGN PATENT DOCUMENTS 8-96891  4/1996  Japan .

Primary Examiner—Steven L. Stephan
Assistant Examiner—Chandrika Prasad
Attorney, Agent, or Firm—Kanesaka & Takeuchi

[57] ABSTRACT

An electrical card connector comprises an ejector (4), a spring member (10) pushing the ejector backward and an ejecting bar (5) advanced by a force from the ejector, applying the force to a transmission mechanism. The ejector comprises an engaging member (12) guided by a cam member (7) provided in housing. The engaging member is engaged with and released from engaging bar. The cam member is provided as a cam groove (17) forming a circulation rout. The cam groove is formed so that the engaging member engages with the ejecting bar only when the ejector advances for card ejection and the engaging member (12) is released from the ejecting bar and the ejector (4) is moved backward under a pressure from the spring member (10) at other times than the card ejection.

4 Claims, 5 Drawing Sheets

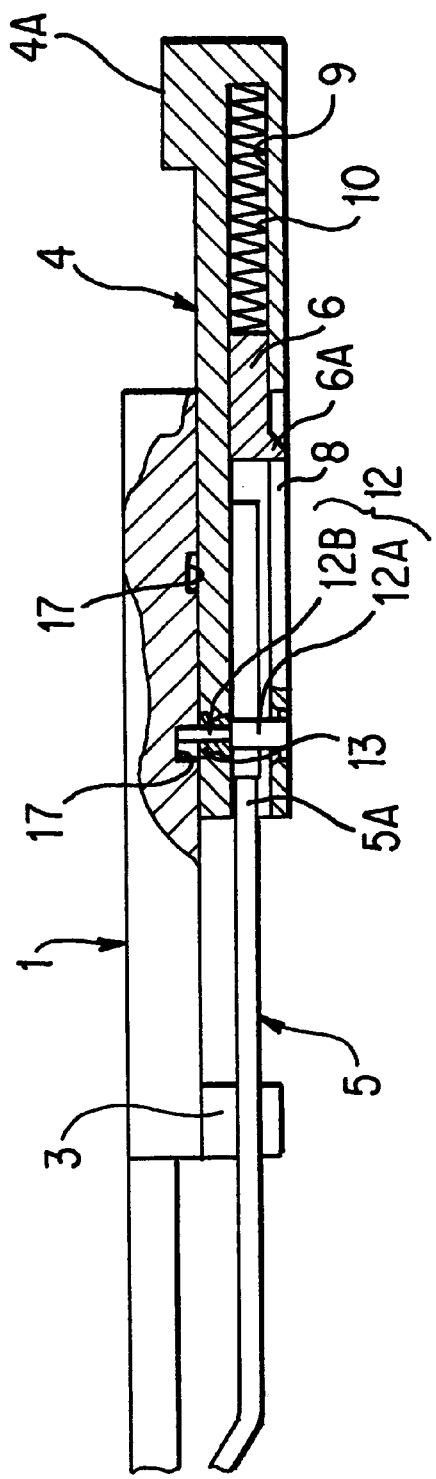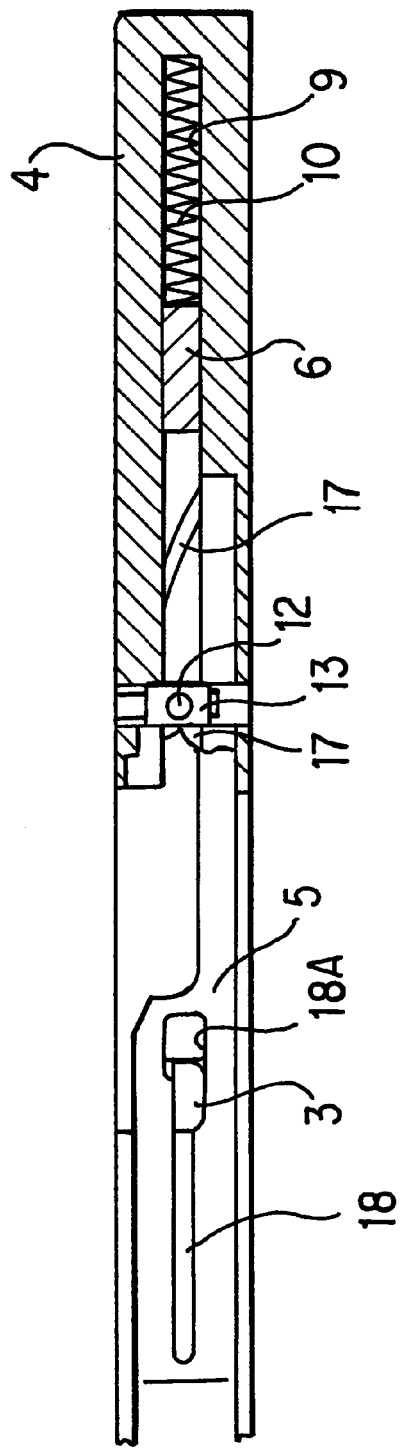
FIG. 2A
FIG. 2B

ELECTRICAL CARD CONNECTOR

BACKGROUND OF THE INVENTION

1. Field of the Invention

This invention relates to electrical card connectors useful for PC cards, compact flash cards and memory cards.

2. Description of the Related Art

This kind of connector has been disclosed by, for example, Japanese patent application Kokai No. 8-96891.

The electrical connector according to the prior art comprises a card ejection mechanism which receives user's handling force and a transmission mechanism which changes the direction of the force from the card ejection mechanism and pushes out a PC card in the card ejection direction. Such an electrical connector is mounted on electronic equipment.

The card ejection mechanism comprises an ejector having a press button for applying a handling force to the rear section, an intermediate bar provided at the front section of the ejector and pushed forwardly by the ejector, and an ejecting bar is pushed forwardly by the intermediate bar. The ejecting bar drives the transmission mechanism when the press button is depressed. The transmission mechanism forces the PC card to an ejection position at the rear section. The intermediate bar is rotated with a predetermined angle near the ejecting bar so that the rear end of the intermediate bar can be moved between two positions in the direction perpendicular to the back-and-forth direction. Therefore, the rear end can engage with either the front portion or intermediate portion of the ejector. Consequently, the total length of the intermediate bar and the ejector is changed depending on the engagement. The total length is made so long that the press button can be easily pressed to eject the PC card. However, the length is made short during other times to minimize the amount of projection of the press button, thus minimizing interference with operation of the electronic equipment.

The connector according to the prior art comprises a first cam and a second cam in the housing. A resilient member provided on the ejector engages with the first cam and controls the round trip movement of the ejector. A guided shaft provided on the intermediate bar engages with the second cam and rotates to switch the intermediate bar between the two positions.

According to the electrical connector of the above Japanese patent 8-96891, the amount of projection of the press button is sufficiently large to provide easy ejection of an PC card but so small that there is little interference with operation of the electronic equipment.

However, this connector has the intermediate bar between the ejector and the ejecting bar and the two cams. The increased number of necessary parts makes the connector complicated, increases the manufacturing and assembling costs, and makes the connector bulky. Therefore, there is a demand for a more compact connector.

SUMMARY OF THE INVENTION

Accordingly, it is an object of this invention to provide an electrical connector for an electrical card, which has almost the same function as the connector of the prior art but a simplified and compact structure.

According to the invention, there is provided an electrical card connector, which is mounted on electronic equipment and accommodates a removable electrical card, comprising a transmission mechanism for changing the direction of a force from a card removal mechanism and transmitting the changed force to the front section of the card. The connector further comprises an ejector movable in the back-and-forth direction and having a press button from which the card ejection mechanism receives an outside pressure.

The card ejection mechanism comprises an ejector guided by a first guidance section provided in a housing, a spring member provided between the housing and the ejector to bias the ejector toward an exit of the first guidance and an ejecting bar which receives a pressure from the ejector and advances under guidance of a second guidance section to apply a pressure to the transmitting mechanism.

The ejector has an engaging member engaging with the cam member provided in the housing and guided by the cam member. The engaging member is engageable with a rear end of the ejecting bar in the back-and-forth direction.

The cam member comprises a cam groove mainly extending in the back-and-forth direction forming a circulation route, and the engaging member is engaged with the cam groove. The cam groove is formed such that the engaging member engages with the ejecting bar only when the ejector is advanced by a pressure from an ejecting button upon card ejection, but the engaging member is released from the ejecting bar during other times. The ejector is moved backward by a pressure from the spring member during such other times.

According to the structure of the invention described above, before the card is ejected, the ejector is pushed backward by the spring member so that the press button of the ejector projects to a large extent from the outside of the electronic equipment. At this point, the engaging member provided on the ejector is not engaging with the rear end of the ejecting bar, but staying at a position ready to engage when the ejector is advances.

In order to remove the card, the press button is pushed forward to advance the ejector, and the engaging member engages with the rear end of the ejecting bar to advance the ejecting bar. A force created by the advancement of the ejecting bar drives the transmission mechanism, which changes the direction of the force, and pushes the card backward to a position for card removal. Thus, the card can be removed by the user. When the ejector arrives at the most advanced position; that is, when the card arrives at the ejecting position, the engaging member is brought into the position where it is released from the rear end of the ejecting bar by the guidance of the cam member and locked at this position.

When a new card is inserted, the front end of this card pushes the ejecting bar backward through the transmission mechanism. The ejecting bar can move backward since the engagement with the engaging member has been released. The rear end of the ejecting bar stays behind the engaging member. Accordingly, the engaging member and the press button on the ejector are still at the advanced position, thus minimizing interference with operation of the electronic equipment.

When the card is removed, the press button is depressed to release the lock between the engaging member and the cam member. The ejector is then brought back by the spring member so that the engaging member occupies a position behind the ejecting bar, where it can engage with the rear end of the ejecting bar when the press button is depressed. Thus, the ejection operation as described above is made possible.

According to the invention, the cam groove forms a circulation route in a wall of the housing. The engaging member is formed as a pin, of which the top is guided by the cam groove and may be made movable directly or indirectly by the ejector in the direction perpendicular to the back-and forth direction.

In addition, the cam groove is divided into a plurality of areas having different depths, forming shoulders or slopes so that the engaging member, which is biased against the bottom of the can groove, can move only in one direction.

BRIEF DESCRIPTION OF THE DRAWINGS

FIG. 2(A) is a partial cross-section of the electrical connector.

FIG. 2(B) is a longitudinal section of the electrical connector.

DETAILED DESCRIPTION OF THE INVENTION

Embodiments of the invention will now be described with reference to the accompanying drawings.

Figure 1:
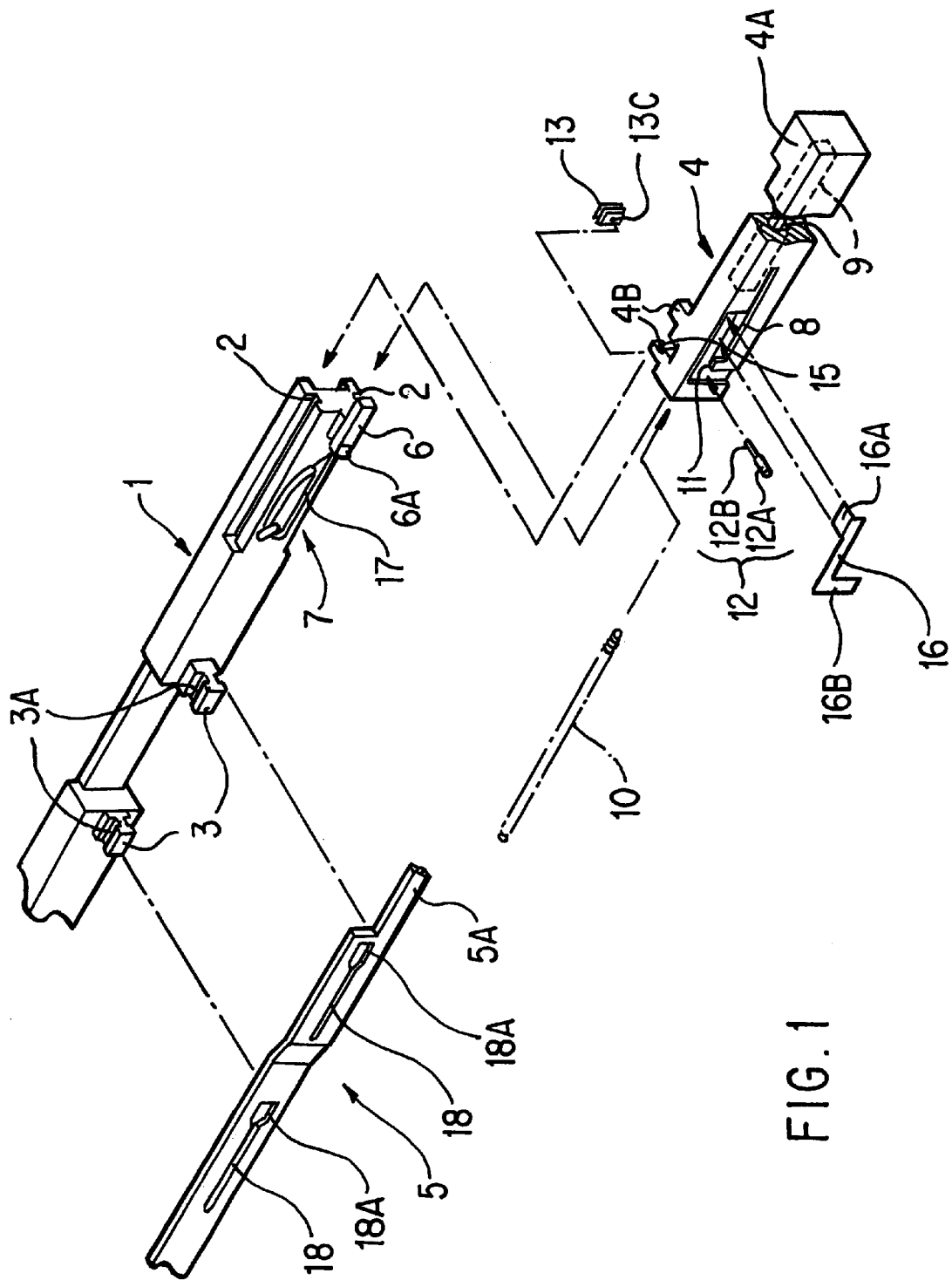
FIG. 1 is a perspective view of an electrical connector according to an embodiment of the invention.

In FIG. 1, an arm 1, a part of a housing, is provided along a side of a PC card, a compact flash card, or a memory card (not shown) which is inserted into a slot formed in the housing. FIG. 1 shows only one of a pair of the arms 1. The arm 1 may be an independent element and form one body with the housing after being fixed to the housing.

The arm 1 has a first guidance section 2 at an end and a second guidance section 3 in the middle. The first guidance section 2 supports and guides an ejector 4 so that the ejector 4 can move forwardly and backwardly. The second guidance section 3 supports and guides an ejecting bar 5 so that the ejector bar 5 can move forwardly and backwardly. The first guidance section 2 is formed as grooves in the top and the bottom of the rear end section of the arm 1. The second guidance section 3 is formed as projections having grooves 3A. A press pole 6 is provided on the left bottom of the rear end of arm 1. A stopper 6A of a triangle projection is provided on the front end of the press pole 6. A cam member 7 is provided on the left side of the rear portion of the arm 1, which is described later.

As shown in FIGS. 1 and 2, the ejector 4 has a press button 4A at the rear end thereof and guided arms 4B at the front side thereof and is guided by the first guidance section 2. A hollow section 8 is provided on the left side of the ejector 4, a part of which communicates with a spring accommodation hole 9. The spring accommodating hole 9 communicates with the hollow section 8 at the front section thereof as mentioned above and is closed at the rear end thereof near the rear end of the press button 4A. The hole 9 receives a coil spring 10 from the front end thereof and the press pole 6 after accommodating the coil spring 10. The press pole 6 has the stopper 6A which engages with the entrance section of the hole 9 so that the press pole 6 is not inserted deeper than a predetermined position.

Figure 3:
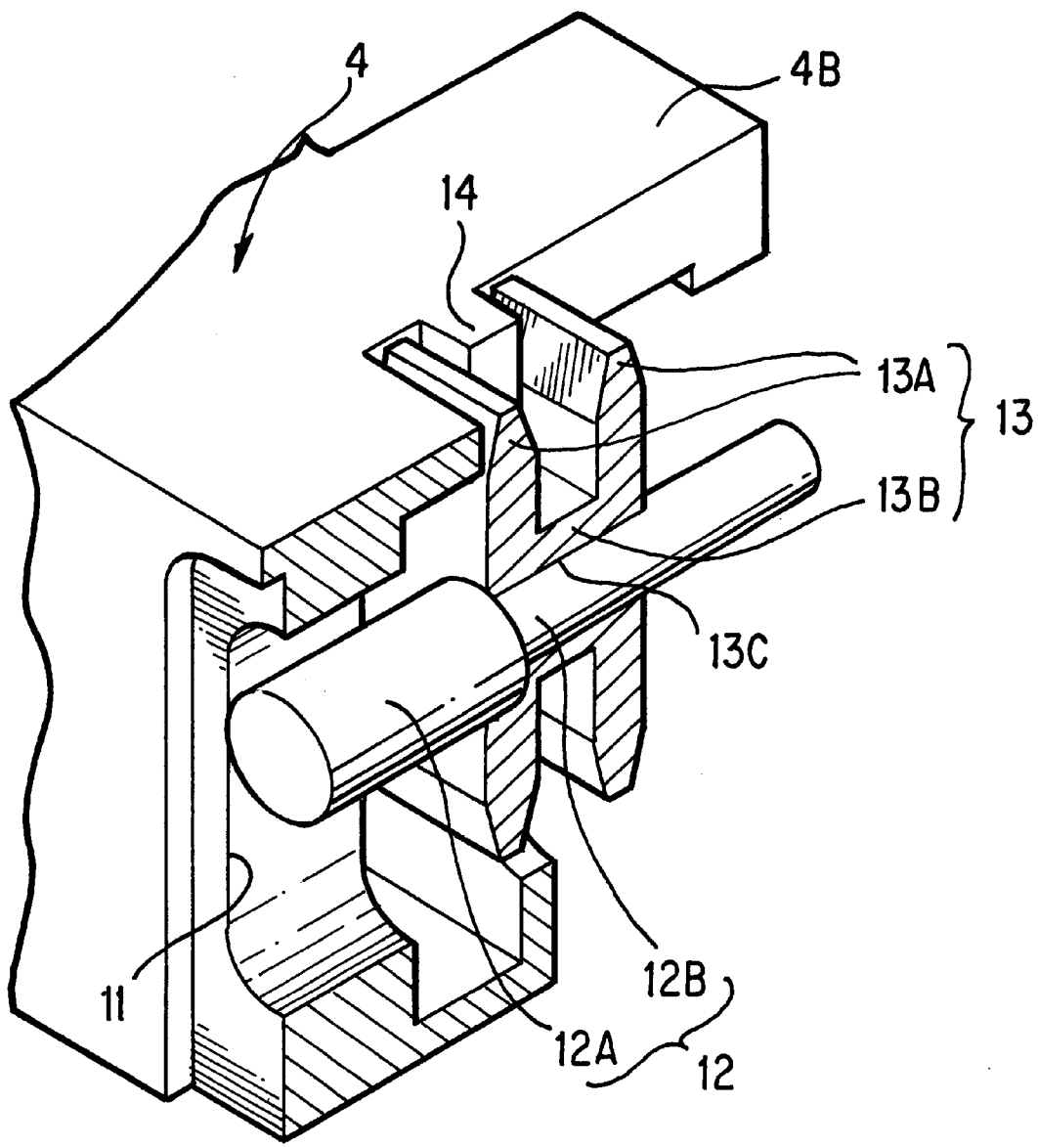
FIG. 3 is a partially section, perspective view of an engaging pin and its surrounding of the electrical connector.

The ejector 4 has a vertically elongated hole 11 which is provided at the front end of the hollow section 8 so as to pass through in the direction from left to right. An engaging pin 12 is inserted in the hole 11. The engaging pin 12 has a big-diameter section 12A on one end and a small-diameter section 12B on the other end. The small-diameter section 12B is inserted in the hole 11 in such a manner that the top thereof projects from the right side of the ejector 4. A slider 13 is fixed in the middle of the small-diameter section 12B. As shown in FIG. 3, the slider 13 comprises two plates 13A and a pipe 13B connecting the two plates 13A and having a through-hole 13C therein. The slider 13 is fixed on the small-diameter section 12B of the pin 12 by the hole 13C and movable upward and downward by the plates 13A. The ejector 4 is provided with a guidance space 15 and a protruded portion 14 which extends into the space 15 and is sandwiched between the two plates 13A. The protruded portion 14 engages with the two plates 13A to guide them in the up-and-down direction.

An L-shaped leaf spring 16 is fixed on the ejector 4 by inserting a base section 16A into a slit (not shown) provided in the hollow section 8 of the ejector 4. A free end section 16B extending downwardly applies a right ward pressure to the big-diameter section 12A so that the pin 12 is prevented from coming off from the hole 11.

Figure 4:
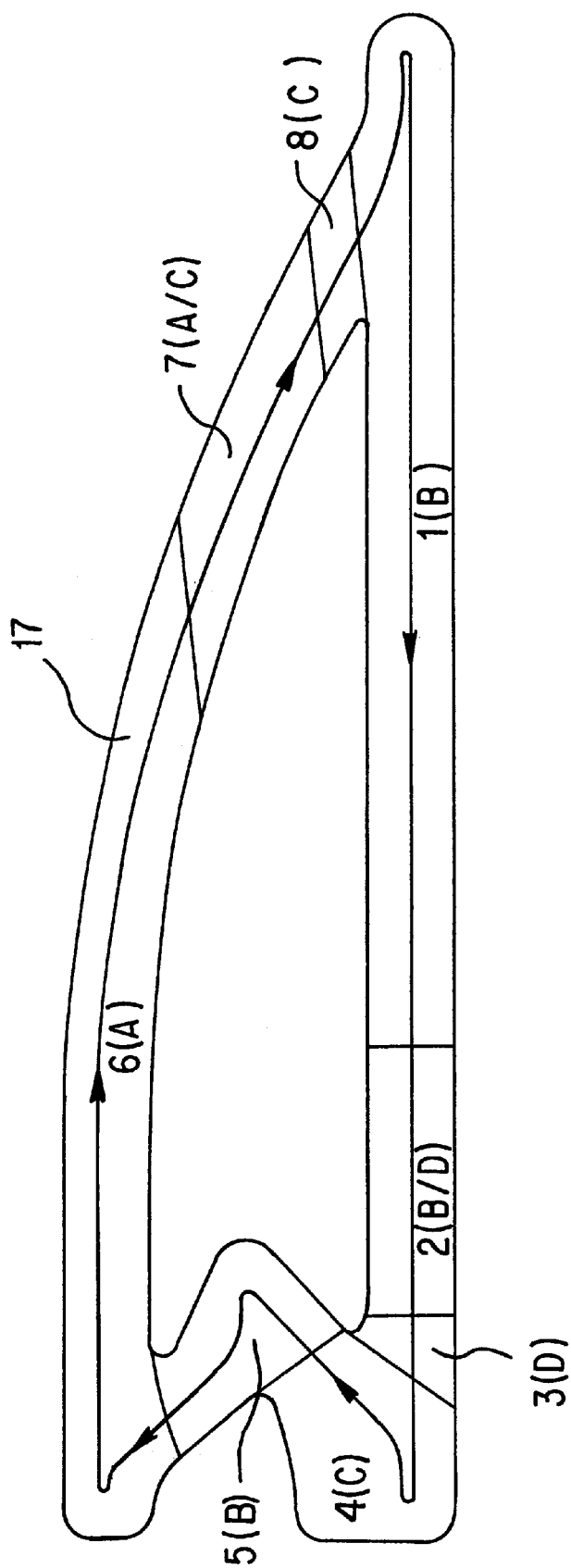
FIG. 4 is a diagram showing a cam groove of the electrical connector.

The cam 7 is provided on the left side of the arm 1. The cam member 7 has a cam groove 17 which is provided on the surrounding area of an island part of the cam member 7 and works as a circulation groove. As shown in FIG. 4, the cam groove 17 is heart-shaped and extends mainly in the back-and-forth direction (left and right direction in FIG. 4). The bottom portion of the cam groove 17 is straight. The top portion gradually curves downwardly and is connected to the right end of the bottom portion. The bottom portion and the top portion are connected at a dented portion of the left side. The cam groove 17 is divided into eight areas from 1 to 8, which have different depths each other, so that the top of the small-diameter section 12B of the engaging pin 12 moves in one direction and firmly stops at each step during its movement in the cam groove 17. In FIG. 4, a depth (A) is the deepest, a depth (B) is the second deepest, (C) is the third and (D) is the shallowest. Also, a depth (A/C) and a depth (B/C) represent that their depths are continuously and gradually changing from the depth (A) to the depth (C) and from the depth (B) to the depth (D) respectively. Therefore, 1(B) shows the area 1 has the depth (B) and 2(B/D) shows the depth of an area 2 is gradually changing from the depth (B) to the depth (D), forming a sloping bottom.

The ejecting bar 5 is provided with two guidance grooves 18. The guidance grooves 18 extends in the back-and-forth direction and have a window 18A at each of the rear ends. The windows 18A are inserted into the second guidance sections 3 of the arm 1. The ejecting bar 5 is guided by the groove 3A in the back-and-forth direction. The ejecting bar 5 is connected to a transmission mechanism (not shown) at the front end thereof. The transmission mechanism has a lever, which changes the direction of a transmission force between the ejecting bar 5 and the transmission mechanism. In addition, a part of the transmission mechanism engages with the front edge of a PC card (not shown) and applies the force to the PC card in the back-and-forth direction.

Next, the operation of the connector according to the invention will be described below with reference to FIG. 5.

Figure 5A:
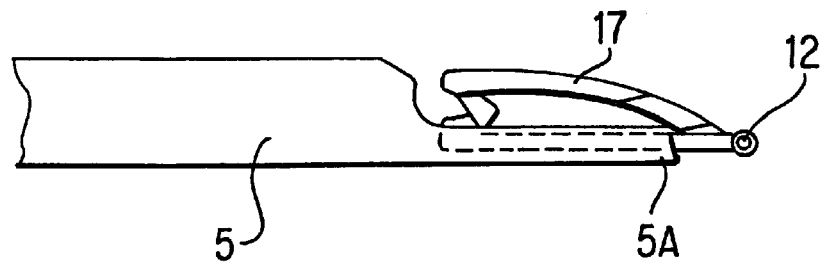
FIG. 5(A) is a step when a press button is moved back just before card removal.

(1) When a card is inserted in the connector, a contact section of the transmission mechanism with the card is pushed by the card and located at the most advanced position. Accordingly, the ejecting bar 5 is located at the least advanced position by the direction-changing function of the transmission mechanism, and a rear end section 5A of the ejecting bar is moved back as shown in FIG. 5(A). At this point, the engaging pin 12 (the small-diameter section 12A) of the ejector 4 is pushed by the coil spring 10 to the rear end position of the cam groove 17 or the right end of the area 1.

Figure 5B:
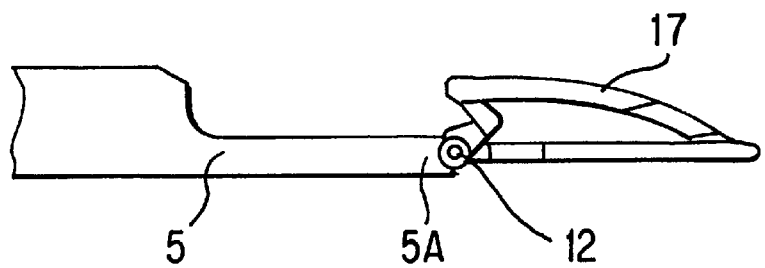
FIG. 5(B) is a step when a card is removed.

(2) To remove the card, the user presses the press button 4A of the ejector 4 in forward direction. As the ejector 4 advances, the engaging pin 12 advances along the area 1 of the cam groove 17 in the direction of an arrow and pushes the rear end section 5A of the ejecting bar 5 in the forward direction, thereby advancing the ejecting bar as shown in FIG. 5(B). At this point, the engaging pin 12 does not move to the area 8, because the area 8 is shallower than the area 1, making a shoulder between these areas. In this way, the engaging pin 12 advances only in the arrow direction in every area.

(3) The engaging pin 12 further moves from the depth-changing area 2 to the shallowest area 3 and the second shallowest area 4 but cannot move from the area 4 to the area 3 because of such a shoulder as described above. When the ejector pin 12 arrives at the area 4, the ejecting bar 5 reaches the most advanced position and the transmission mechanism moves back sufficiently to eject the card, thereby enable the user to remove the card.

(4) When the user releases the press button 4A, the ejector 4 is moved back by the pressure of the coil spring 10. However, the engaging pin 12 can not overcome the shoulder between the area 4 and the area 5 and can not advance in the reverse direction. Accordingly, the engaging pin 12 is moved to the deeper area 5 and is locked there. It means that the pin 12 moves upward from the position described in the above (3). Accordingly, the pin 12 is released from the rear end section 5A of the ejecting bar 5; that is, the engagement between the ejecting bar 5 and ejector 4 is released. A new card can be inserted under this condition.

Figure 5C:
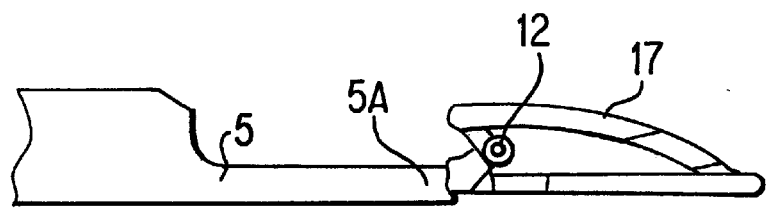
FIG. 5(C) is a step just before a card is inserted.
Figure 5D:
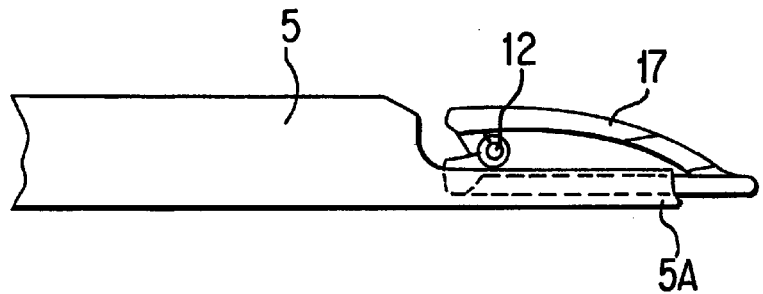
FIG. 5(D) is a step when a card is inserted.
Figure 5E:
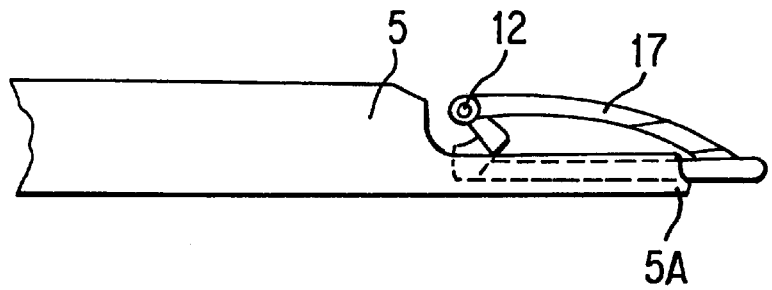
FIG. 5(E) is a step when a lock is released before the card removal.

(5) When a new card is inserted, the contact portion of the transmission mechanism with the card is moved by the pressure from the card, and therefore, the ejecting bar 5 is moved back as shown in FIG. 5(D). The rear end section 5A of the ejecting bar 5 can move back because the engagement between the pin 12 and the ejecting bar 5 has been released. That is, the pin 12 is locked at the same position as shown in FIG. 5(C) and the press button 4A of the ejector 4 is at the advanced position, thereby minimizing interference with handling of the connector.

(6) When the user depresses the press button 4A again to eject the card, the pin 12 is pushed forward to enter the deepest area 6 of the cam groove 17 as shown in FIG. 5 (E). When the press bottom is released, the ejector 4 receives backward pressure from the coil spring 10, and the pin 12 passes the area 7 and 8 and reaches the right end of the area 8. Thus, the condition of the connector returns to the initial stage described in the above (1), which is ready to eject the card.

As fully described above, according to the invention, the ejector and ejecting bar are advanced by the engaging pin provided on the ejector when a card is removed, and the engagement between the pin and ejecting bar is released by guidance of the cam. Accordingly, the connector according to the invention requires no intermediate member required by the conventional equipment and can reduce the quantity of parts used. Also, the ejector is advanced by the necessary distance at the time of card ejection while the press button of the ejector is held at the advanced position at other times to thereby minimize interference with the equipment operation. The structure is simplified and the manufacturing cost is reduced by decreasing the quantity of parts.

I claim:

1. An electrical card connector, comprising:

an arm having first and second guidance sections;

an ejector guided by said first guidance section in a longitudinal direction of said arm and having a press button;

a spring member provided between said first guidance section and said ejector to push said ejector backward toward an exit of said first guidance section;

an ejecting bar pushed by said ejector and guided by said second guidance section;

a cam groove provided in said arm;

an engaging member engaging with said cam groove to guide said ejector and able to engage with said ejecting bar in said longitudinal direction;

characterized in that said cam groove is formed so that said engaging member makes engagement with said ejecting bar only when said ejector is advanced by a pressure from said press button and is released from said engagement with said ejecting bar while said ejector is moved backward by a pressure from said spring member when said ejector is not advanced.

2. An electrical card connector according to claim 1, wherein said engaging member is made as a pin having a top guided by said cam groove and is guided directly or indirectly by said ejector in a direction perpendicular to said longitudinal direction.

3. An electrical card connector according to claim 2, wherein said cam groove is divided into a plurality of areas having different depths, forming shoulders or slopes between said areas so that said engaging member can move only in one direction.

4. An electrical card connector according to claim 3, wherein a leaf spring is fixed to said ejector to push said engaging member to a bottom of said cam groove.

* * * * *